United States Patent [19]
Namgoong et al.

[11] Patent Number: 5,945,820
[45] Date of Patent: Aug. 31, 1999

[54] DC-DC SWITCHING REGULATOR WITH SWITCHING RATE CONTROL

[75] Inventors: Won Namgoong, Stanford; Teresa Meng, Portola Valley, both of Calif.

[73] Assignee: The Board of Trustees of the Leland Stanford Junior University, Stanford, Calif.

[21] Appl. No.: 09/019,902

[22] Filed: Feb. 6, 1998

Related U.S. Application Data

[60] Provisional application No. 60/037,340, Feb. 6, 1997.

[51] Int. Cl.[6] ............................................. G05F 1/40
[52] U.S. Cl. ................................. 323/282; 323/266
[58] Field of Search ............................. 323/282, 266, 323/283, 285, 289

[56] References Cited

U.S. PATENT DOCUMENTS

| | | | |
|---|---|---|---|
| 4,293,904 | 10/1981 | Brooks et al. | 323/266 |
| 5,070,294 | 12/1991 | Nochi | 323/267 |
| 5,399,958 | 3/1995 | Iyoda | 323/282 |
| 5,594,324 | 1/1997 | Canter et al. | 323/282 |
| 5,617,016 | 4/1997 | Borghi et al. | 323/284 |
| 5,671,149 | 9/1997 | Brown | 323/282 |
| 5,747,976 | 5/1998 | Wong et al. | 323/282 |
| 5,774,734 | 6/1998 | Kikinis et al. | 323/282 |
| 5,808,455 | 9/1998 | Schwartz et al. | 323/283 |
| 5,838,147 | 11/1998 | Suzuki et al. | 323/289 |
| 5,847,554 | 12/1998 | Wilcox et al. | 323/282 |

*Primary Examiner*—Peter S. Wong
*Assistant Examiner*—Bao Q. Vu
*Attorney, Agent, or Firm*—Lumen Intellectual Property Services

[57] ABSTRACT

A DC—DC switching regulator which converts a supplied DC voltage $V_{DD}$ to a DC output voltage $V_{OUT}$ for driving a load using a DC—DC buck converter operated with fixed-width pulses $V_X$ at an instantaneous switching rate $n_i$. The regulator has a feedback for computing a subsequent switching rate $n_{i+1}$ based on the instantaneous switching rate $n_i$, an output frequency $f_{OUT}$ derived from output voltage $V_{OUT}$ by a ring oscillator and a desired frequency $f_{DES}$ provided by a frequency signaling device or a frequency signaling port of the load. By altering the desired frequency $f_{DES}$ the load communicates its power needs. The regulator can be used in the low-power regime and at high power levels.

19 Claims, 6 Drawing Sheets

DC-DC SWITCHING REGULATOR WITH SWITCHING RATE CONTROL

RELATED APPLICATIONS

This application is based in part on Provisional Application No. 60/037,340 filed Feb. 6, 1997 which is herein incorporated by reference.

This invention was supported by grant number N65236-96-C-8608 by DARPA. The Government has certain rights in the invention.

FIELD OF THE INVENTION

This invention relates to variable voltage DC—DC voltage converters or switching regulators with switching rate control for use in supplying DC output voltages to loads operating in the energy-on-demand paradigm.

BACKGROUND OF THE INVENTION

Many electronic devices or loads driven by DC power require one or more stable DC supply voltages for operation. These DC supply voltages are usually obtained with the aid of AC-DC converters which employ typical transformers and rectifiers as well as suitable capacitors and filters to convert an AC supply voltage to a determined DC voltage. More complicated electronic loads, such as data processing units and logic circuits are more refined as to their voltage requirements. For example, processing circuits may process vastly different amounts of data at various points in time. This means that their workloads and hence energy requirements vary significantly. Such loads would benefit greatly from an adjustable and well-defined DC supply voltage by reducing their power consumption.

Prior art techniques for deriving a variable DC output voltage $V_{OUT}$ from a DC supply voltage $V_{DD}$ for use by variable loads have been proposed. The article by L. Nielsen et al. entitled "Low-Power Operation Using Self-Timed Circuits and Adaptive Scaling of Power Supply Voltage", *IEEE Transaction on VLSI Systems,* December 1995, pp. 391–397 proposes an approach to dynamically adjust the supply voltage based on the processing load. A similar idea for tracking temperature and process variations using a dynamic switching regulator has been proposed by M. Horowitz in "Low Power Processor Design Using Self-Clocking", *Workshop on Low-Power Electronics,* 1993.

Both of these ideas rely on using a DC—DC switching regulator capable of delivering an output voltage as required for operating the load. For example, when the load is a processor operating at a specific clock rate and the incoming data requires processing at a different rate, a desired clock rate is sent to the DC—DC converter. The converter then appropriately varies the supply voltage of both the processor and a ring oscillator so that the frequency of the ring oscillator matches the desired clock rate. When operating at a fixed processing rate, this type of DC—DC converter tracks the delay variations due to temperature and process change to operate at the lowest voltage level required.

Unfortunately, these types of prior art DC—DC switching regulators are not very responsive—they have a slow tracking speed. As a result, such regulators can not be effectively employed in the energy-on-demand paradigm.

The prior art also teaches the use of controllers to maintain feedback stability of DC—DC regulators. The best known strategy is the lead-lag compensation technique. Implementation of this type of compensation becomes very difficult because of the wide range of operating conditions that the regulator must handle. Depending on the load, output voltage and switching frequency the location of the poles and zeroes move by substantial amount. To maintain stability with fast response time, the regulator needs to quickly compensate for unstable poles. Such complex regulators require an enormous amount of computational power, which for the low-power applications involves a large fraction of the total power delivered, thus greatly reducing power efficiency and defeating the purpose of the regulator.

A practical variable voltage DC—DC regulator has to be simple to implement and operate reliably over a wide range of output loads and supply voltages, i.e., in the low-power regime and any other power regime required. In addition, it has to have a fast tracking speed.

OBJECTS AND ADVANTAGES OF THE INVENTION

Accordingly, it is a primary object of the present invention to provide an efficient variable voltage DC—DC switching regulator for converting a supplied voltage to an output voltage for a wide range of loads. In particular, the DC—DC regulator has to be able to power processing units and other loads requiring varying power levels.

It is another object of the invention to ensure that the regulator has a fast tracking speed and exhibits minimal ripple in the output voltage.

Yet another object of the invention is to provide a DC—DC regulator well-suited for operation in the low-power regimes.

These and other objects and advantages will become apparent upon reading the specification.

SUMMARY OF THE INVENTION

These objects and advantages are attained by a DC—DC regulator which converts a supplied DC voltage $V_{DD}$ to a DC output voltage $V_{OUT}$ for driving a load, e.g., a signal processing unit. The DC—DC regulator has a DC—DC buck converter. The DC—DC buck converter has a chopping arrangement, preferably two switching devices such as NMOS and PMOS transistors, which operate at an instantaneous switching rate $n_i$ and convert the DC voltage $V_{DD}$ into a series of fixed-width pulses. The buck converter also has a filter which converts the fixed-width pulses to the output voltage $V_{OUT}$. The filter accomplishes this task with an inductor and a capacitor.

The DC—DC regulator also has a frequency signaling device which signals a desired frequency $f_{DES}$ based on the load's needs. In one embodiment, the load has a frequency signaling port which is connected to the DC—DC regulator and itself supplies the desired frequency $f_{DES}$.

Further, the DC—DC regulator has a feedback arrangement connected to the frequency signaling device (e.g., the load's frequency signaling port) and to the buck converter. The feedback arrangement computes from the desired frequency $f_{DES}$ and the DC output voltage $V_{OUT}$ and the instantaneous switching rate $n_i$ a subsequent switching rate $n_{i+1}$. This subsequent switching rate $n_{i+1}$ is then used to operate the chopping arrangement.

The layout of the DC—DC regulator can vary. In one embodiment the inductor and capacitor belonging to the filter are located off-chip from the chopping arrangement. In another embodiment the inductor and the capacitor are located on the same chip as the chopping arrangement. In yet another embodiment the filter, the chopping arrangement and the feedback are all located on the same chip. In fact, in a preferred embodiment all the above elements and the load are integrated on the same chip.

In the preferred embodiment the feedback has a ring oscillator which receives and converts the DC output voltage $V_{OUT}$ to an output frequency $f_{OUT}$. The feedback has a logic for calculating the subsequent switching rate $n_{i+1}$ from the output frequency $f_{OUT}$, the desired frequency $f_{DES}$ and the instantaneous switching rate $n_i$.

The logic consists of a first counter connected to the ring oscillator for receiving and converting the output frequency $f_{OUT}$ to a count. A comparator with a first and second inputs and an output has its first input connected to the counter to get the count. A numerically controlled oscillator (NCO) with a numerical input and a rate output which delivers the instantaneous switching rate $n_i$ is connected to the second input of the comparator and to the chopping arrangement. Finally, a second counter is connected to the frequency signaling device for receiving the desired frequency $f_{DES}$. The second counter has a reset connected the output of the comparator and a counting output connected to the input of the numerically controlled oscillator such that when the first input of the comparator equals the second input the reset is activated and the rate output at that time yields the subsequent switching rate $n_{i+1}$.

According to the method of the invention, the computation of the subsequent switching rate $n_{i+1}$ performed by the feedback arrangement is described by the following equation:

$$n_{i+1} = n_i \times \frac{f_{DES}}{f_{OUT}}.$$

Alternatively, the feedback and its logic are set up to compute the subsequent switching rate $n_{i+1}$ according to the equation:

$$n_{i+1} = n_i \times \frac{f_{DES} - f_{OUT}}{f_{OUT}} + n_i.$$

The details of the invention and the preferred embodiment are explained in the detailed description with reference to the drawing figures.

DETAILED DESCRIPTION

Figure 1:
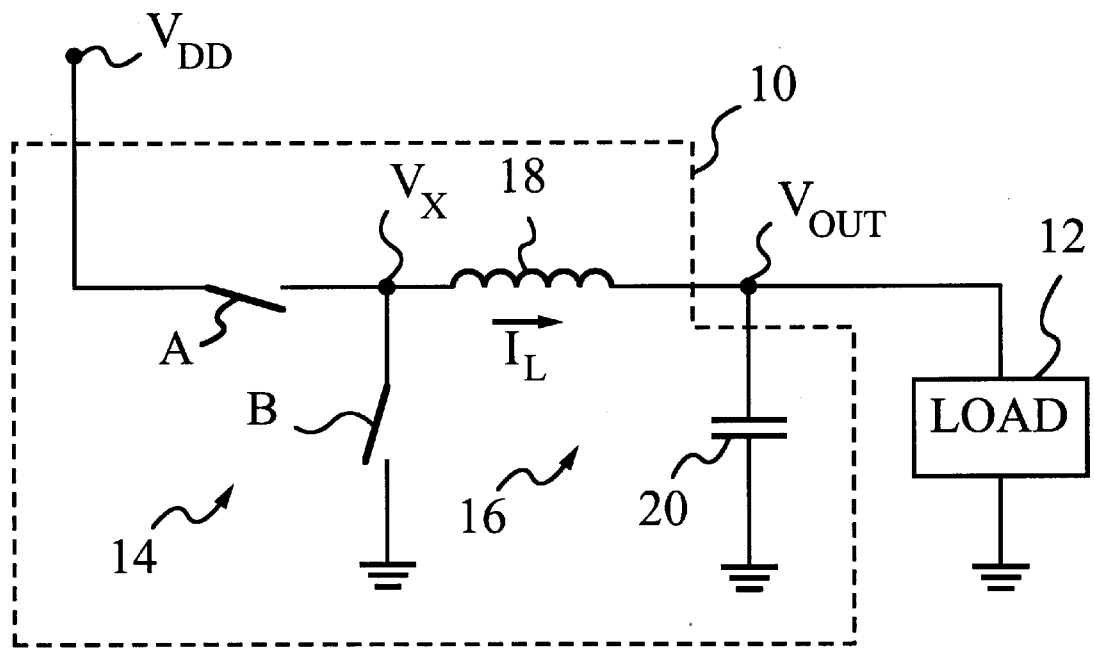
FIG. 1 is a circuit diagram illustrating a prior art DC—DC buck converter.

The circuit diagram in FIG. 1 shows a prior art DC—DC buck converter 10 driving a load 12 with a DC output voltage $V_{OUT}$ derived from a supplied DC voltage $V_{DD}$. Converter 10 has two switches A and B which form a chopper 14. A filter 16 is connected to chopper 14. Filter 16 consists of an inductor 18 and a capacitor 20.

Figure 2A:
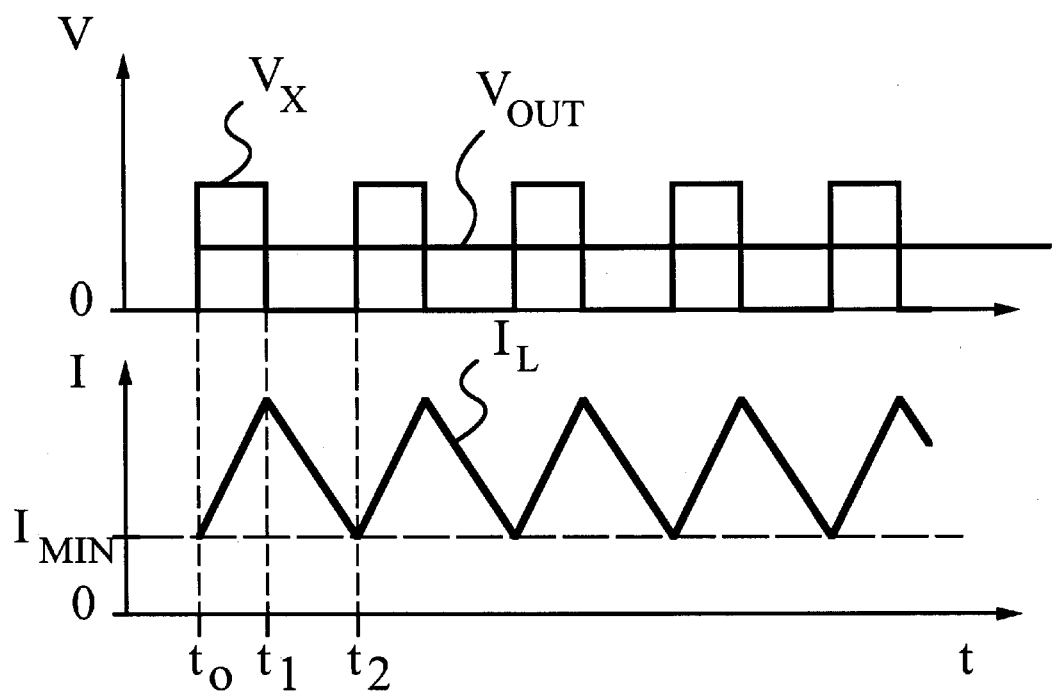
FIG. 2A is a diagram illustrating the operation of the buck converter of FIG. 1 in the continuous mode.

When operated in the continuous mode, as illustrated in FIG. 2A, chopper 14 delivers fixed-width pulses of voltage $V_X$. Typically, voltage $V_X$ is equal to voltage $V_{DD}$ as switches A and B do not cause any voltage drops. Filter 16 converts these pulses to output voltage $V_{OUT}$ which is approximately equal to voltage $V_{DD}$ multiplied by the duty cycle. The graph of current $I_L$ in inductor 18 shows that in the continuous operation mode current $I_L$ does not fall below a minimum value $I_{MIN}$.

Figure 2B:
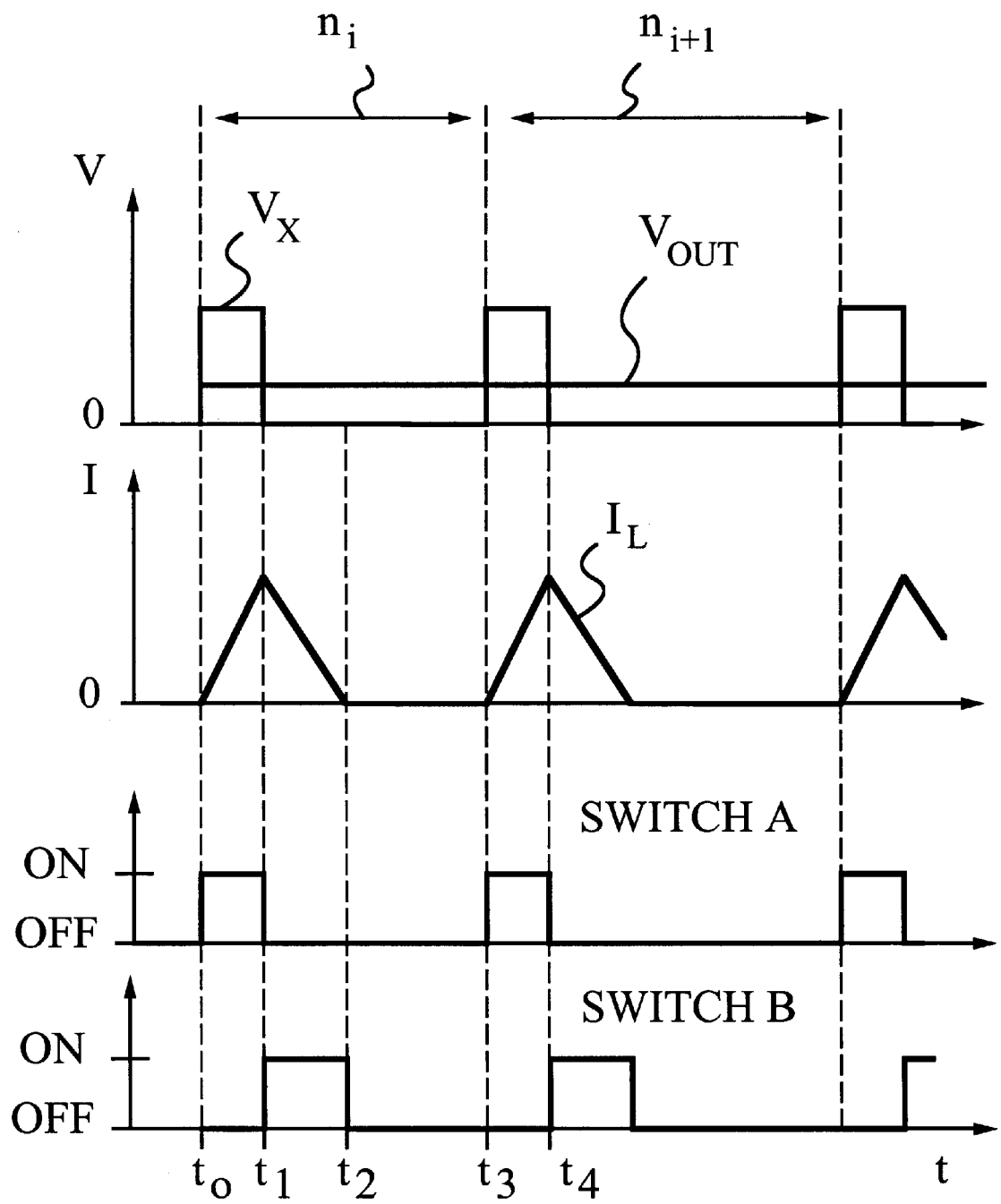
FIG. 2B is a diagram illustrating the operation of the buck converter of FIG. 1 in the discontinuous mode.

When operated in the discontinuous mode, as shown in FIG. 2B, chopper 14 delivers pulses of voltage $V_X$ at certain intervals, such that current $I_L$ in inductor 18 goes to zero between the pulses. The lowest graph also shows the ON-OFF states of switches A and B in correspondence to the pulses generated. Output voltage $V_{OUT}$ is typically altered in the discontinuous operation mode by either changing the width of the pulses or their separation.

Figure 3:
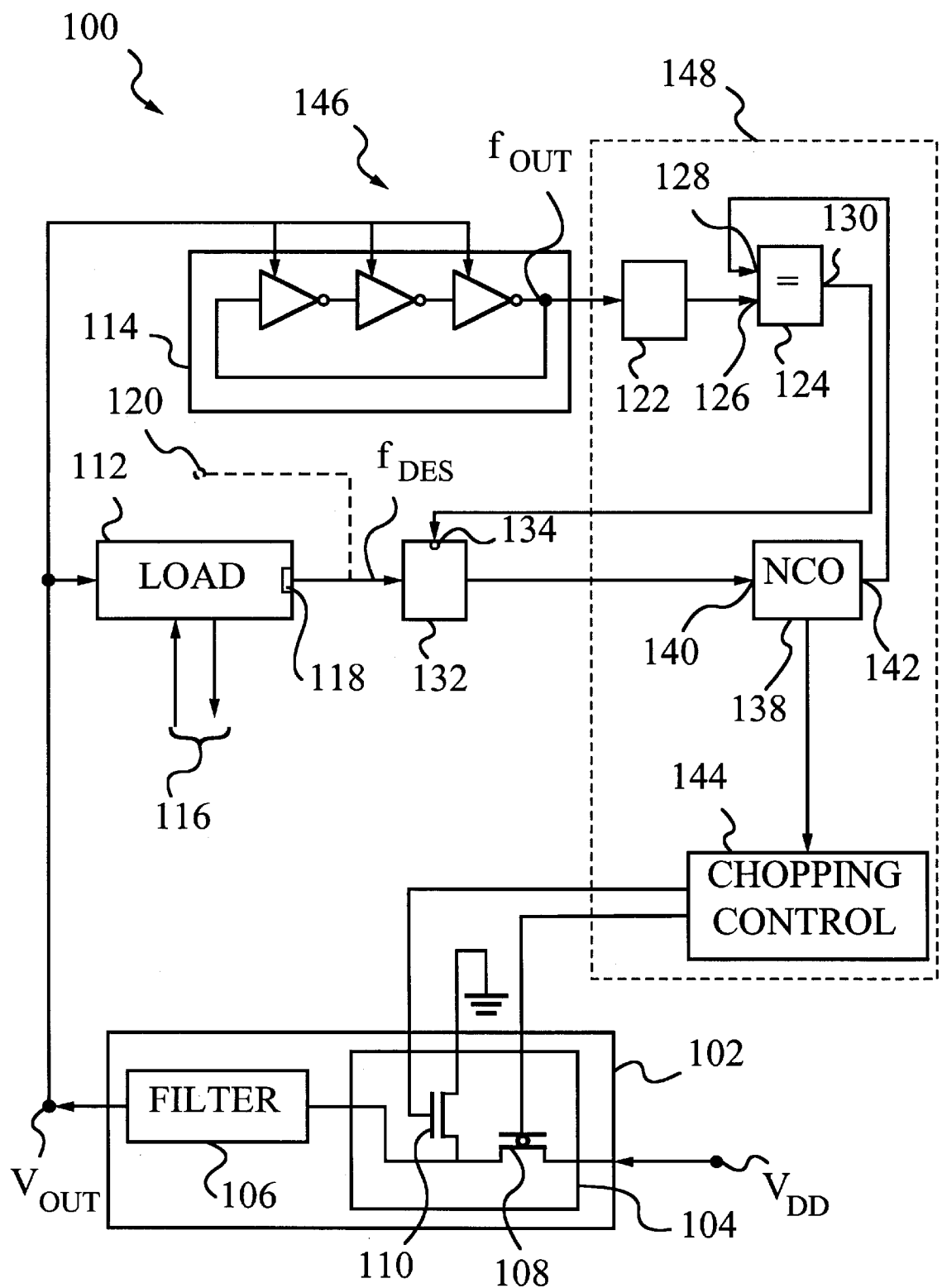
FIG. 3 is a block schematic illustrating a DC—DC switching regulator according to the invention.

FIG. 3 shows a DC—DC switching regulator 100 according to the invention. Regulator 100 is equipped with a DC—DC buck converter 102 having a chopper 104 and a filter 106. Switches A and B of chopper 104 in this embodiment are replaced by transistors 108 and 110. Preferably, transistors 108 and 110 are PMOS and NMOS power transistors.

A DC voltage $V_{DD}$ is delivered to converter 102 from a DC source, e.g., a battery (not shown). Output voltage $V_{OUT}$ is obtained from converter 102 and delivered to a load 112 and to a ring oscillator 114.

Load 112 is of the type requiring a variable DC voltage. In the present embodiment, load 112 is a digital processing unit, e.g., a computer processor, or a similar device. The power requirements of processing unit 112 vary depending on the amount of data being processed through its I/O port 116. In particular, unit 112 has to operate at a higher internal clock rate when a large amount of data is being processed. For this reason unit 112 requires a higher supply voltage at those times which means that $V_{OUT}$ must be increased. Meanwhile, the power used by unit 112 is proportional to the square of output voltage $V_{OUT}$ ($P=CV_{OUT}^2$). Thus, operating at high clock rates increases unit's 112 power consumption.

Preferably, unit 112 has a frequency signaling port 118 for communicating a desired frequency $f_{DES}$. In this case unit 112 signals its demand for a higher or lower voltage $V_{OUT}$ to be supplied by converter 102 by raising or lowering desired frequency $f_{DES}$.

Alternatively, a separate port or a frequency signaling device 120 external to unit 112 is provided. The function of signaling device 120 is the same as that of port 118. Device 120 may be in direct communication with unit 112 to determine power requirements or it may determine these requirements indirectly.

Ring oscillator 114 is a voltage controlled device which delivers an output frequency $f_{OUT}$ proportional to the voltage applied, in this case proportional to output voltage $V_{OUT}$.

The output of oscillator 114 is connected to a first counter 122 which converts output frequency $f_{OUT}$ to a numerical count. The count is delivered to a first input 126 of a comparator 124. Comparator 124 has a second input 128 and an output 130. The function of comparator 124 is to compare the value received at second input 128 to the count received at first input 126. When the count at first input 126 is equal to the value at second input 128 output 130 sends a corresponding signal. Comparators of this type are well-known in the art.

Frequency signaling port 118 of unit 112 is connected a second counter 132. Counter 132 has a reset 134 which is connected to output 130 of first comparator 124. Counter 132 also has a counting output 136. In the configuration shown, counter 132 receives desired frequency $f_{DES}$ from frequency signaling port 118 (or frequency signaling device 120) and also receives the signal from first counter 124 when the count is equal to the value at second input 128. The signal from first counter 124 activates reset 134 and effectively zeroes out counting output 136 and allows second counter 132 to recommence counting.

A numerically controlled oscillator (NCO) 138 is connected to counting output 136 of second counter 132. NCO 138 is a device which converts a numerical input at its numerical input 140 to a rate at its rate output 142. Oscillators of this kind are well-known in the art.

Rate output 142 of NCO 138 is connected to second input 128 of comparator 124 and to a chopping control 144. Chopping control 144 controls the transistors 108 and 110 to ensure that they produce fixed-width pulses at the switching rate dictated by rate output 142.

Devices 114, 122, 124, 132, 138 and 144 operating together constitute a feedback 146 of regulator 100. Of these devices, first and second converters 122, 132, comparator 124 and NCO 138 represent a logic 148.

When operating in the low-power regime, e.g., in the range from ≈1 mW to a few hundred mW, DC—DC switching regulator 100 is preferably operated in the discontinuous mode (see FIG. 2B). That is because operation in the continuous mode (see FIG. 2A) at low power levels would require filter 106 to have a large inductor. Thus, during discontinuous mode operation regulator 100 receives supplied voltage $V_{DD}$ and transistors 108, 110 of chopper 104 chop $V_{DD}$ into fixed-width pulses $V_X$ (see, FIG. 2B).

Next, filter 106 generates output voltage $V_{OUT}$ from fixed-width pulses $V_X$. Output voltage $V_{OUT}$ is approximately equal to $V_X$ multiplied by the duty cycle. In general, the duty cycle can be varied by either changing the width of the pulses or the switching frequency of transistors 108, 110. In the present invention, however, the duty cycle is varied by changing the switching frequency only.

Specifically, referring to FIG. 2B, at time $t_0$ through $t_3$ fixed-width pulses $V_X$ are delivered to filter 106 at an instantaneous switching rate $n_i$. At time $t_3$ the switching rate is adjusted and fixed-width pulses $V_X$ are delivered at a subsequent switching rate $n_{i+1}$ which induces a change in output voltage $V_{OUT}$.

The actual adjustment of output voltage $V_{OUT}$ is performed by feedback 146 based on desired frequency $f_{DES}$ signaled by signaling device 120 or port 118 of processor 112. For example, after output voltage $V_{OUT}$ corresponding to instantaneous switching rate $n_i$ is delivered to processor 112 the power requirement of processor 112 changes. In other words, processor 112 requires a different output voltage $V_{OUT}$ which corresponds to subsequent switching rate $n_{i+1}$.

Logic 148 calculates subsequent switching rate $n_{i+1}$ from output frequency $f_{OUT}$, desired frequency $f_{DES}$ and instantaneous switching rate $n_i$ according to the following equation:

$$n_{i+1} = n_i \times \frac{f_{DES}}{f_{OUT}}.$$

To perform the above calculation, logic 148 requires three inputs: instantaneous switching rate $n_i$, desired frequency $f_{DES}$ and output frequency $f_{OUT}$. These three inputs are provided by rate output 142 of NCO 138, signaling device 120 or port 118 and ring oscillator 114 respectively.

The calculation is executed by logic 148 in several stages. First, output frequency $f_{OUT}$ is converted to the count by first counter 122. Next, comparator 124 compares the count with instantaneous switching rate $n_i$ and its output 130 remains low as long as the count is less than instantaneous switching rate $n_i$. As soon as the count is equal to instantaneous switching rate $n_i$, output 130 goes high and sends a signal to activate reset 134 of second counter 132. At this time second counter 132 is set back to zero and the value received at input 140 of NCO 138 is converted to yield subsequent switching rate $n_{i+1}$ at rate output 142. In other words, comparator 130 has the function of interrupting second counter 132.

Subsequent switching rate $n_{i+1}$ is delivered to chopping control 144 to drive transistors 108, 110 and generate fixed-width pulses $V_X$ at subsequent switching rate $n_{i+1}$. Filter 106 is thus instructed to adjust the value of output voltage $V_{OUT}$ as requested by processor 112. Subsequent switching rate $n_{i+1}$ is also fed back to second input 128 of comparator 124 and the calculation of the next switching rate commences. In other words, subsequent switching rate $n_{i+1}$ now becomes instantaneous switching rate $n_i$.

Figure 4:
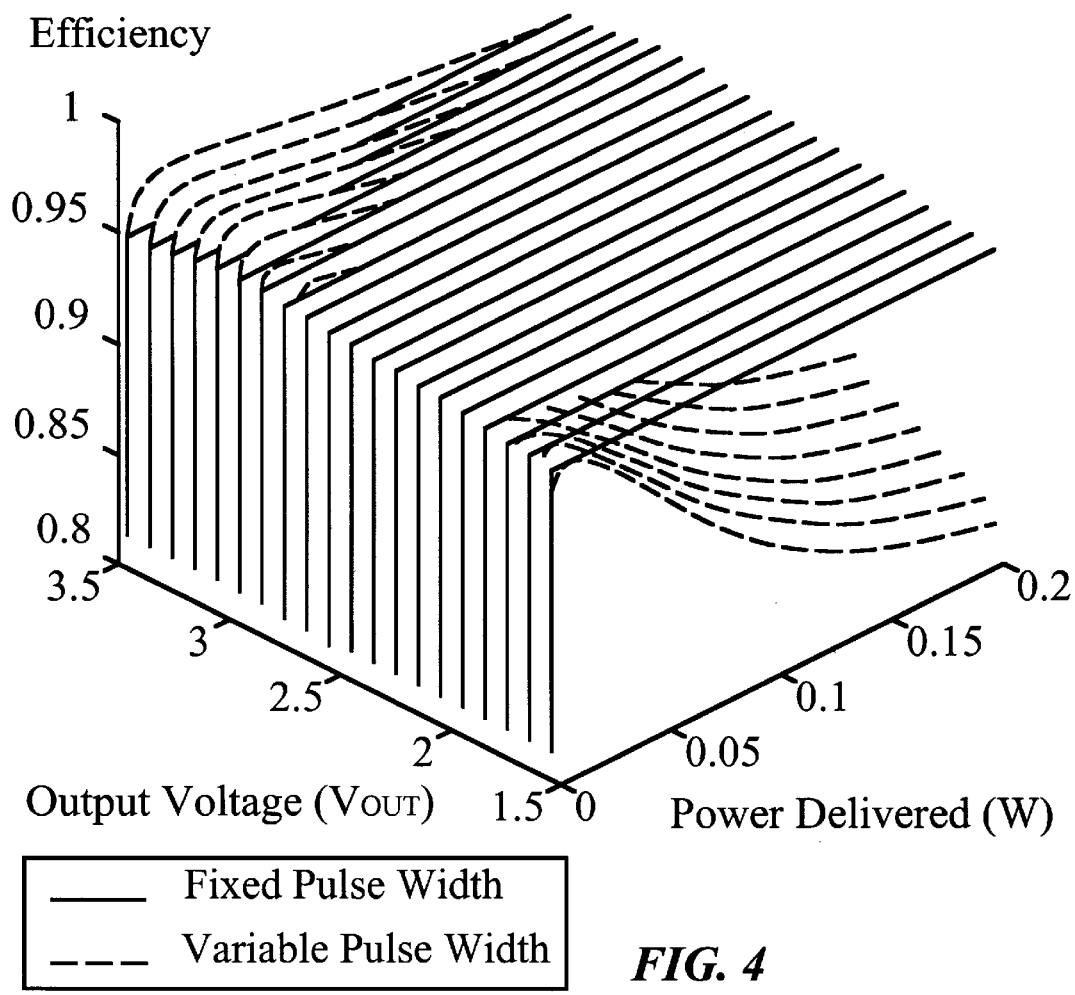
FIG. 4 is a graph illustrating operation efficiencies of the continuous and discontinuous modes.
Figure 6:
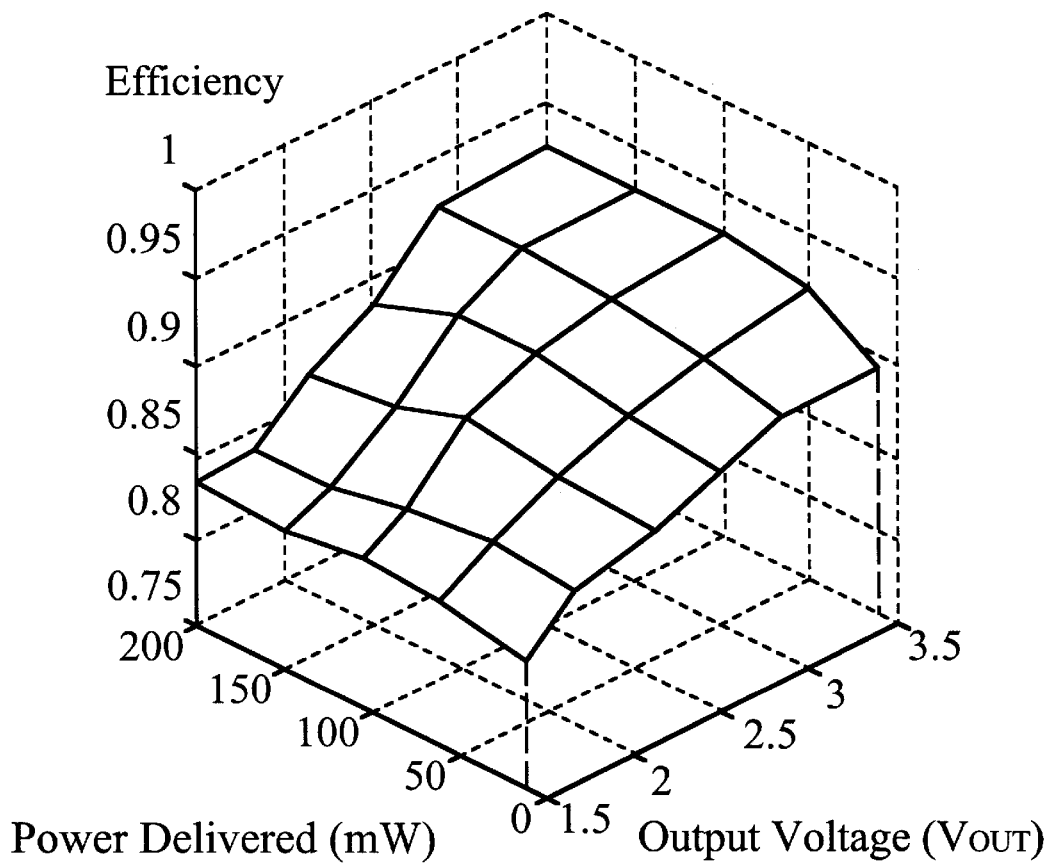
FIG. 6 is another graph illustrating the efficiency of the DC—DC switching regulator according to the invention.

Non-linear feedback 146 is stable. Operating in the discontinuous mode the power delivered by switching regulator 100 is very stable as shown in the graph of FIG. 4 which compares regulator 100 with a device using variable pulse width control. As better illustrated in FIG. 6, the efficiency of regulator 100 ranges between 83% and 93%.

This efficiency is ensured by maintaining fixed-width pulses $V_X$ and varying the switching frequency as described above. In addition, since the size of optimal power transistors 108, 110 remains relatively invariant as load 112 or its power level requirements change transistors 108, 110 are optimized as follows.

Since the amount of energy per pulse remains constant and the power consumed by power transistors 108, 110 is by far the largest component of the overall power dissipation it has to be limited for regulator 100 to be efficient. The power dissipated by PMOS and NMOS transistors consists of gate-drive, switching and conduction losses. The sizes of PMOS and NMOS transistors 108, 110 are calculated to minimize total power requirements by differentiating the overall power with respect to the width of transistors 108, 110 according to the following equation:

$$W_{PMOS,opt} = \sqrt{\frac{R_p t_{pulse}^3 (V_{DD} - V_{OUT})^2}{3L^2 C_p V_{DD}^2}},$$

where $t_{pulse}$ is the width of fixed-width pulses $V_X$, L is the inductance value, $C_p$ is the effective PMOS switching capacitance per unit width and $R_p$ is the PMOS channel resistance-length. The optimal size of NMOS transistor can be derived in an analogous manner. When employing fixed-width pulses $V_X$, $W_{PMOS,opt}$ is independent of the resistance of load 112 and exhibits an approximately linear dependence on output voltage $V_{OUT}$. In the graph of FIG. 4 the parameters were chosen as follows: $W_{PMOS,opt}$=20 mm, $W_{NMOS,opt}$=10 mm, L=7 µH and $t_{pulse}$=500 nsec in 0.8-µm CMOS technology.

Figure 5A:
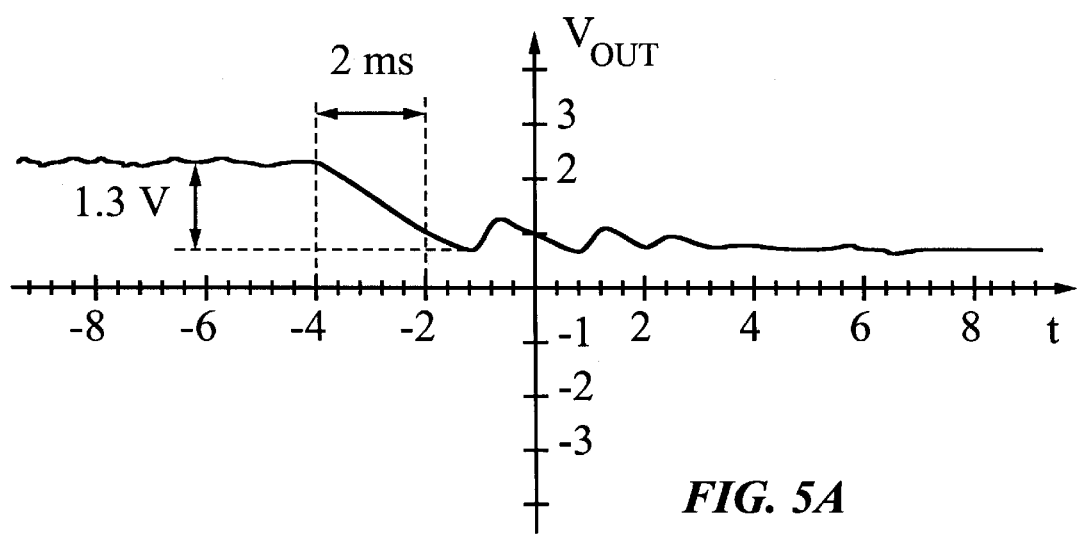
FIG. 5A is a graphs illustrating the tracking speed of the DC—DC switching regulator of the invention when decreasing the output voltage.
Figure 5B:
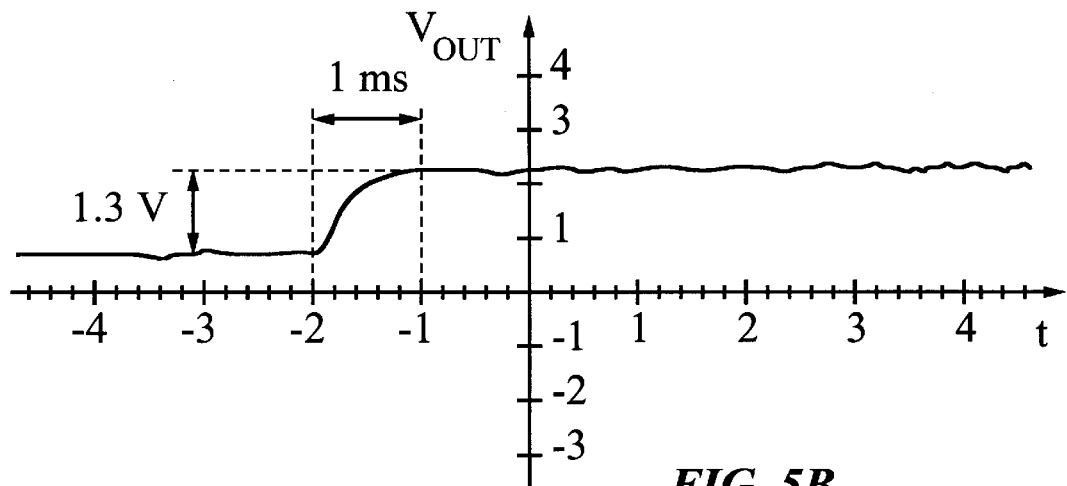
FIG. 5B is a graph illustrating the tracking speed of the DC—DC switching regulator of the invention when increasing the output voltage.

Feedback 146 also provides for an excellent tracking response. FIG. 5A indicates that regulator 100 can track a 1.3 V voltage drop within a 2 ms interval. As shown in FIG. 5B, a 1.3 V rise in voltage is tracked within 1 ms. The ripple is less than 2%.

In the graphs of FIGS. 5A–B the tracking speed was defined as the time taken to reach steady-state at new output voltage $V_{OUT}$. Regulator 100 on which measurements for graphs in FIGS. 4, 5A–B and 6 were performed had a load resistance of 100 Ω, power level variation between 10 mW and 200 mW and supply voltage $V_{DD}$ of 5 V. Regulator 100 was designed in MOSIS 0.8-µm CMOS technology and had its output voltage $V_{OUT}$ ranged from 1.5 to 3.5 V.

Based on these performance figures switching regulator 100 is very well-suited for driving low-power loads. Of course, regulator 100 can also be scaled to drive larger loads and can, if necessary, be modified to operate in the continuous mode. When making corresponding modifications the parasitic series resistance between power transistors 108, 110 and other elements of feedback 146 should be considered. Specifically, the parasitic series resistance increases the dependence of the overall efficiency on output voltage $V_{OUT}$ and loading conditions. This effect is more pronounced in the state of the art regulators using variable pulse width. In the case of regulator 100 these problems are rendered negligible by operating in the discontinuous mode with fixed-width pulses $V_X$. Nevertheless, should the modifications and scaling causes parasitic series resistance to become non-negligible, a person of ordinary skill in the art will be familiar with the many solutions to this problem.

Figure 7:
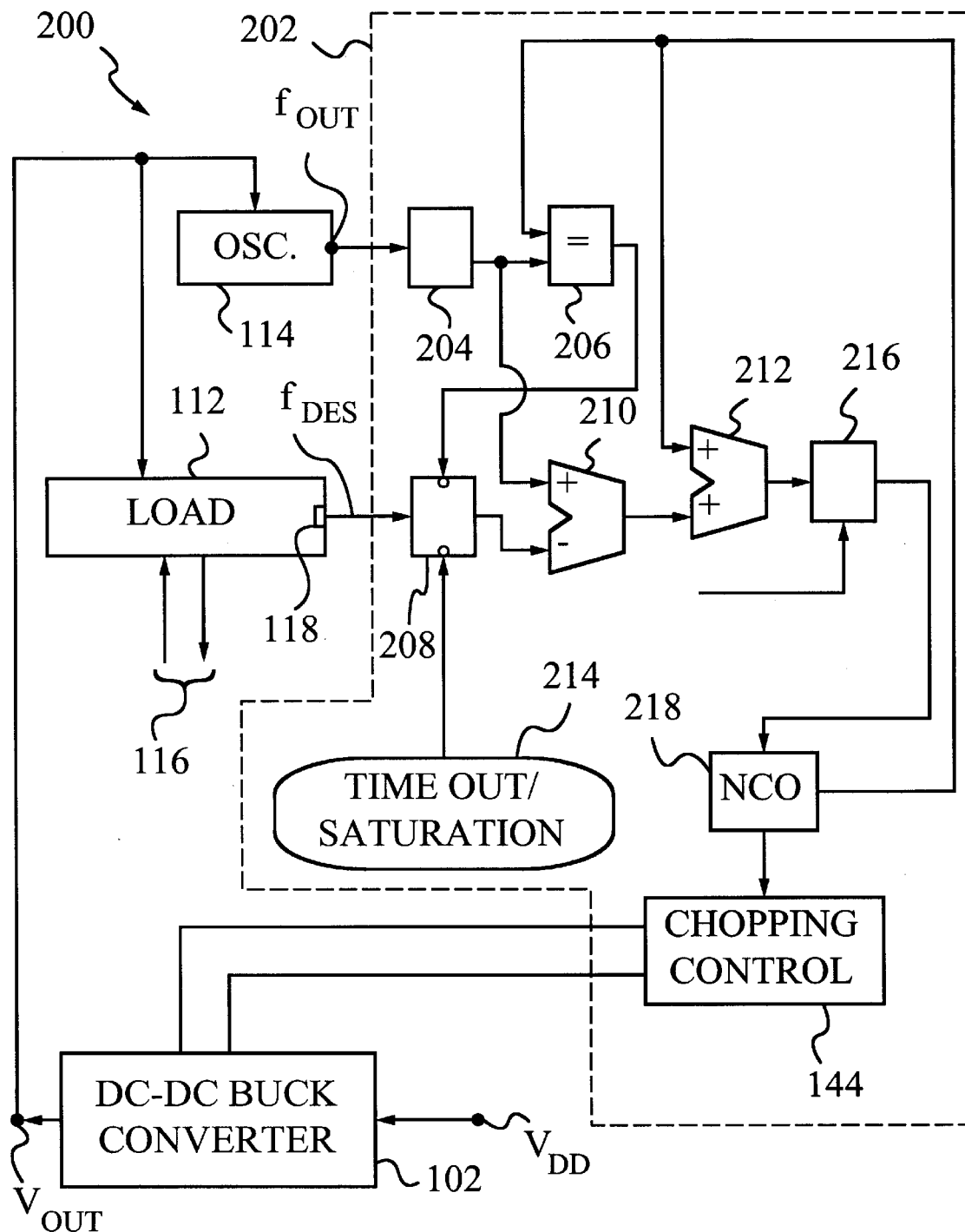
FIG. 7 is a block schematic of another embodiment of a DC—DC switching regulator according to the invention.

FIG. 7 illustrates another embodiment of a regulator 200 according to the invention. Like parts are referred to by the same reference numbers for convenience. Regulator 200 is very similar to regulator 100 and is a preferred embodiment of the invention by virtue of the feedback logic it employs.

Regulator 200 has a logic 202 which computes subsequent switching rate $n_{i+1}$ in accordance with the following equation:

$$n_{i+1} = n_i \times \frac{f_{DES} - f_{OUT}}{f_{OUT}} + n_i.$$

The electrical components of logic 202 required to make this computation include a first counter 204, a first comparator 206, a second counter 208, a subtracting gate 210 an adding gate 212, a time-out/saturation circuit 214, a third counter 216 and an NCO 218. These components compute subsequent switching rate $n_{i+1}$ from the same three input values, namely: instantaneous switching rate $n_i$, desired frequency $f_{DES}$, and output frequency $f_{OUT}$.

The advantage of this embodiment is due to time out/saturation circuit 214. In cases when the difference between instantaneous switching rate $n_i$ and subsequent switching rate $n_{i+1}$ is large or the subsequent switching rate $n_{i+1}$ is very high (close to continuous mode condition), filter 106 of DC—DC converter 102 is susceptible to saturation problems. In other words, inductor current $I_L$ may not sink zero before the next pulse of fixed-width pulse series $V_X$ has to be generated (see FIG. 2B). This condition is sensed by circuit 214 by monitoring filter 106 and when saturation is a problem circuit 214 sends a signal to second counter 208 and the counting process is reset. Since desired frequency $f_{DES}$ will remain high as long as load 112 requests a higher output voltage $V_{OUT}$, the switching rate will be increased during the next calculation as much as possible before saturation problems arise. In effect, circuit 214 regulates and makes gradual the change in switching rate until the desired output voltage $V_{OUT}$ is delivered by converter 102.

Depending on the operating parameters, switching regulators according to the invention can be designed on one chip or several chips. Based on regulator 100 of FIG. 3, for example, when the inductor required in filter 106 is large and may interfere with the operation of other components, e.g., chopper 104, the inductor or entire filter 106 may be located off-chip from chopper 104. Under other circumstances chopper 104 and filter 106 can be integrated on a single chip. Also, filter 106, chopper 104 and feedback 146 can all be located on the same chip if no dangers of interference exist. In fact, even load 112 can be integrated on the same chip. A person of average skill in the art will understand when integrating the elements is possible and desirable.

It will be clear to one skilled in the art that the above embodiment may be altered in many ways without departing from the scope of the invention. For example, in the computation performed by logic 202 the term:

$$n_i \times \frac{f_{DES} - f_{OUT}}{f_{OUT}}$$

may be scaled or filtered before summing it with instantaneous switching rate $n_i$. A person of average skill in the art will appreciate that empirically determined modifications to the general logic, such as the one above may in some cases improve the performance of the regulator especially in situations where it is modified or scaled for new applications. Accordingly, the scope of the invention should be determined by the following claims and their legal equivalents.

What is claimed is:

1. A DC—DC regulator for converting a DC voltage $V_{DD}$ to a DC output voltage $V_{OUT}$ for driving a load, said DC—DC regulator comprising:
    a) a DC—DC buck converter having:
        1) a chopping means operating at an instantaneous switching rate $n_i$ for converting said DC voltage $V_{DD}$ to fixed-width pulses;
        2) a filter for converting said fixed-width pulses to said DC output voltage $V_{OUT}$;
    b) a frequency signaling means for signaling a desired frequency $f_{DES}$;
    c) a feedback means connected to said frequency signaling means and to said DC—DC buck converter for computing from said desired frequency $f_{DES}$ and said DC output voltage $V_{OUT}$ and said instantaneous switching rate $n_i$ a subsequent switching rate $n_{i+1}$ for operating said chopping means.

2. The DC—DC regulator of claim 1, wherein said chopping means comprises a first switching means and a second switching means.

3. The DC—DC regulator of claim 2, wherein said first switching means and said second switching means are selected from the group consisting of PMOS transistors and NMOS transistors.

4. The DC—DC regulator of claim 1, wherein said filter comprises an inductor and a capacitor.

5. The DC—DC regulator of claim 4, wherein said inductor and said capacitor are located off-chip from said chopping means.

6. The DC—DC regulator of claim 4, wherein said inductor and said capacitor are located on a chip with said chopping means.

7. The DC—DC regulator of claim 4, wherein said inductor, said capacitor, said chopping means and said feedback means are located on a chip.

8. The DC—DC regulator of claim 4, wherein said filter, said chopping means, said feedback means and said load are located on a chip.

9. The DC—DC regulator of claim 1, wherein said feedback means comprises:
   a) a ring oscillator for receiving and converting said DC output voltage $V_{OUT}$ to an output frequency $f_{OUT}$; and
   b) a logic means for calculating said subsequent switching rate $n_{i+1}$ from said output frequency $f_{OUT}$, said desired frequency $f_{DES}$ and said instantaneous switching rate $n_i$.

10. The DC—DC regulator of claim 9, wherein said logic means comprises:
    a) a first counter connected to said ring oscillator for receiving and converting said output frequency $f_{OUT}$ to a count;
    b) a comparator having a first input, a second input and an output, said first input being connected to said counter to get said count;
    c) a numerically controlled oscillator having a numerical input and a rate output, said rate output delivering said instantaneous switching rate $n_i$ and being connected to said second input and to said chopping means; and
    d) a second counter connected to said frequency signaling means for receiving said desired frequency $f_{DES}$ and having a reset connected to said output and a counting output connected to said numerically controlled oscillator such that when said first input equals said second input said reset activates and said rate output equals said subsequent switching rate $n_{i+1}$.

11. The DC—DC regulator of claim 1, wherein said load is a digital processing unit.

12. A method for converting a DC voltage $V_{DD}$ to a DC output voltage $V_{OUT}$ for driving a load, said method comprising the following steps:
    a) supplying said DC voltage to a DC—DC buck converter performing the following steps:
       1) converting said DC voltage $V_{DD}$ to fixed-width pulses by using a chopping means operating at an instantaneous switching rate $n_i$;
       2) converting said fixed-width pulses to said DC supply voltage $V_{OUT}$;
    b) signaling a desired frequency $f_{DES}$;
    c) computing a subsequent switching rate $n_{i+1}$ from said desired frequency $f_{DES}$, said output voltage $V_{OUT}$ and said instantaneous switching rate $n_i$;
    d) operating said chopping means at said subsequent switching rate $n_{i+1}$.

13. The method of claim 12, wherein said computing step is performed according to the following equation:

$$n_{i+1} = n_i \times \frac{f_{DES}}{f_{OUT}}$$

where $f_{OUT}$ is the frequency corresponding to said instantaneous switching rate $n_i$.

14. The method of claim 12, wherein said computing step is performed according to the following equation:

$$n_{i+1} = n_i \times \frac{f_{DES} - f_{OUT}}{f_{OUT}} + n_i$$

where $f_{OUT}$ is the frequency corresponding to said instantaneous switching rate $n_i$.

15. A DC—DC regulator for converting a DC voltage $V_{DD}$ to a DC output voltage $V_{OUT}$ for driving a digital signal processing unit having a frequency signaling port for signaling a desired frequency $f_{DES}$, said DC—DC regulator comprising:
    a) a DC—DC buck converter having:
       1) a chopping means operating at an instantaneous switching rate $n_i$ for converting said DC voltage $V_{DD}$ to fixed-width pulses;
       2) a filter for converting said fixed-width pulses to said DC output voltage $V_{OUT}$;
    b) a feedback means connected to said frequency signaling port and to said DC—DC buck converter for computing form said desired frequency $f_{DES}$ and said DC output voltage $V_{OUT}$ and said instantaneous switching rate $n_i$ a subsequent switching rate $n_{i+1}$ for operating said chopping means.

16. The DC—DC regulator of claim 15, wherein said chopping means comprises a first switching means and a second switching means.

17. The DC—DC regulator of claim 16, wherein said first switching means and said second switching means are selected from the group consisting of PMOS transistors and NMOS transistors.

18. The DC—DC regulator of claim 15, wherein said filter comprises an inductor and a capacitor.

19. The DC—DC regulator of claim 15, wherein said feedback means comprises:
    a) a ring oscillator for receiving and converting said DC output voltage $V_{OUT}$ to an output frequency $f_{OUT}$; and
    b) a logic means for calculating said subsequent switching rate $n_{i+1}$ from said output frequency $f_{OUT}$, said desired frequency $f_{DES}$ and said instantaneous switching rate $n_i$.

* * * * *